INVENTOR
MURRAY IRELAND
ATTORNEYS

May 14, 1935.  M. IRELAND  2,001,362
TOASTER
Filed March 19, 1930  5 Sheets-Sheet 2
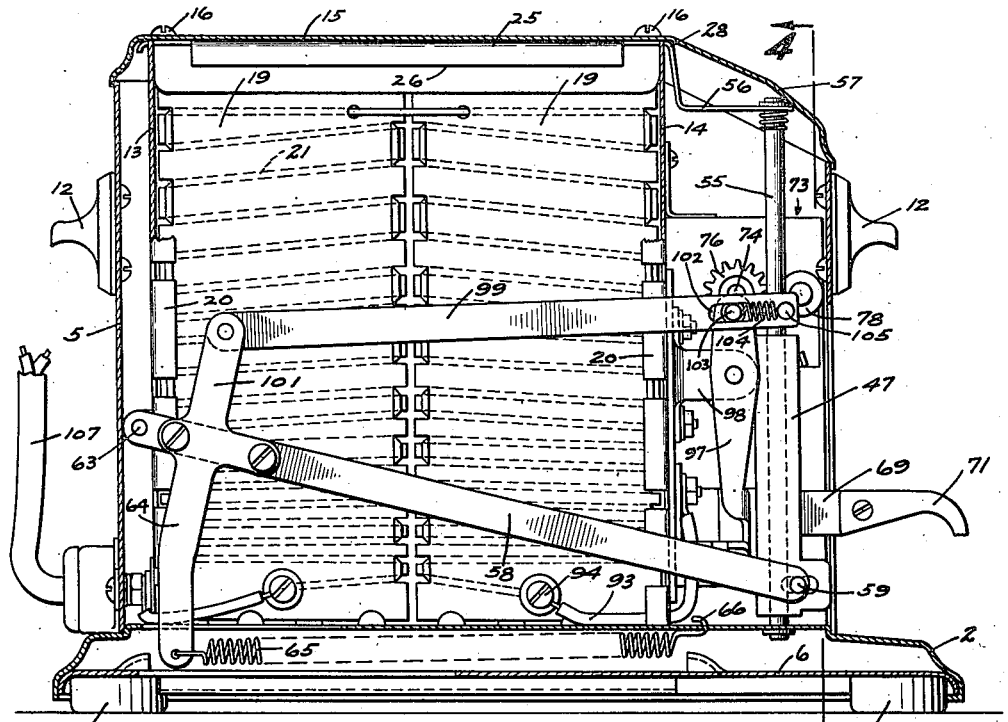
FIG. 3
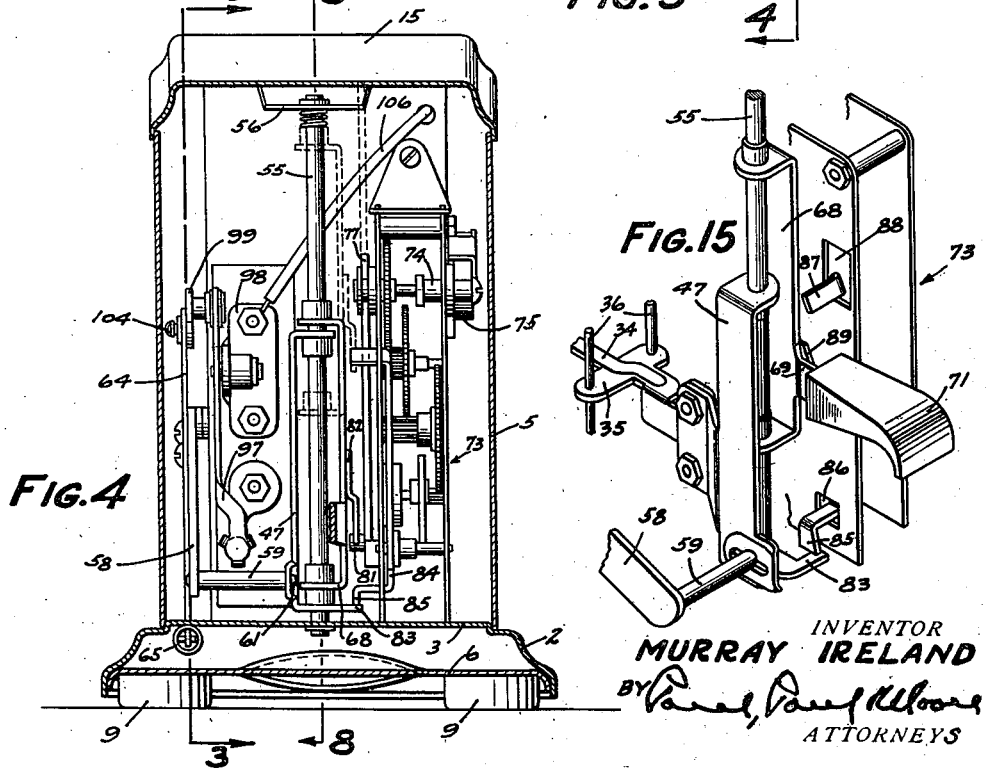
FIG. 4
FIG. 15
INVENTOR
MURRAY IRELAND
BY
ATTORNEYS

INVENTOR
MURRAY IRELAND
BY
ATTORNEYS

May 14, 1935.  M. IRELAND  2,001,362
TOASTER
Filed March 19, 1930  5 Sheets-Sheet 4

INVENTOR
MURRAY IRELAND
BY
ATTORNEYS

May 14, 1935.　　　　M. IRELAND　　　　2,001,362
TOASTER
Filed March 19, 1930　　　5 Sheets-Sheet 5

INVENTOR
MURRAY IRELAND
BY
ATTORNEYS

Patented May 14, 1935

2,001,362

UNITED STATES PATENT OFFICE 2,001,362

TOASTER

Murray Ireland, Minneapolis, Minn., assignor to Waters-Genter Company, Minneapolis, Minn., a corporation of Minnesota Application March 19, 1930, Serial No. 437,071

17 Claims. (Cl. 219—19)

This invention relates to new and useful improvements in bread toasters, particularly automatic toasters, and an object of the invention is to provide a toaster of simple construction and having a minimum number of controls.

A further object of the invention is to provide a toaster having a single operating lever for controlling its operation, and whereby the bread carrier may be moved into and out of bread-toasting positions at will, and manipulation of which also controls the operation of the heating elements.

A further object is to provide an automatic toaster including a bread carrier and a timing mechanism automatically operable to actuate said carrier, after a predetermined toasting interval, to cause the bread to be moved to a non-toasting position, and having an actuator for manually moving the bread carrier into bread toasting position and at the same time to render said timing mechanism operable, said actuator also being adapted, upon reverse movement, to release the bread carrier and permit it to move into non-toasting position independently of the timing mechanism.

A further object is to provide an electric toaster including a toasting chamber having a bread carrier mounted for vertical movement therein, a timing mechanism provided with means for retaining said carrier in bread toasting position, an actuator adapted for manual operation to move said carrier into bread-toasting position and, at the same time, to render said timing mechanism operative, means on said timing mechanism adapted to be actuated by reverse movement of said actuator to cause the release of the bread carrier independently of said mechanism, and means operatively connected with said lever and said timing mechanism for controlling the supply of current to the toaster.

Features of the invention reside in the simple control means; in the means for supporting the bread carrier; in the connection between the control means, the bread carrier, and the timing mechanism whereby, when said control means is moved in one direction, the bread carrier is moved into bread toasting position and the timing mechanism rendered operative, and, when moved in the opposite direction, the bread carrier is manually released to permit it to move to non-toasting position; and, in the means provided for automatically breaking the circuit to the heating elements when the bread carrier is moved into non-toasting position.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 3 is a view similar to Figure 1, showing the parts in bread-toasting positions;

Figure 4 is a vertical sectional view on the line 4—4 of Figure 3;

Figure 15 is a perspective view, showing the connections between the operating member, the bread carrier support, and the timing mechanism.

Frame

Figure 8:
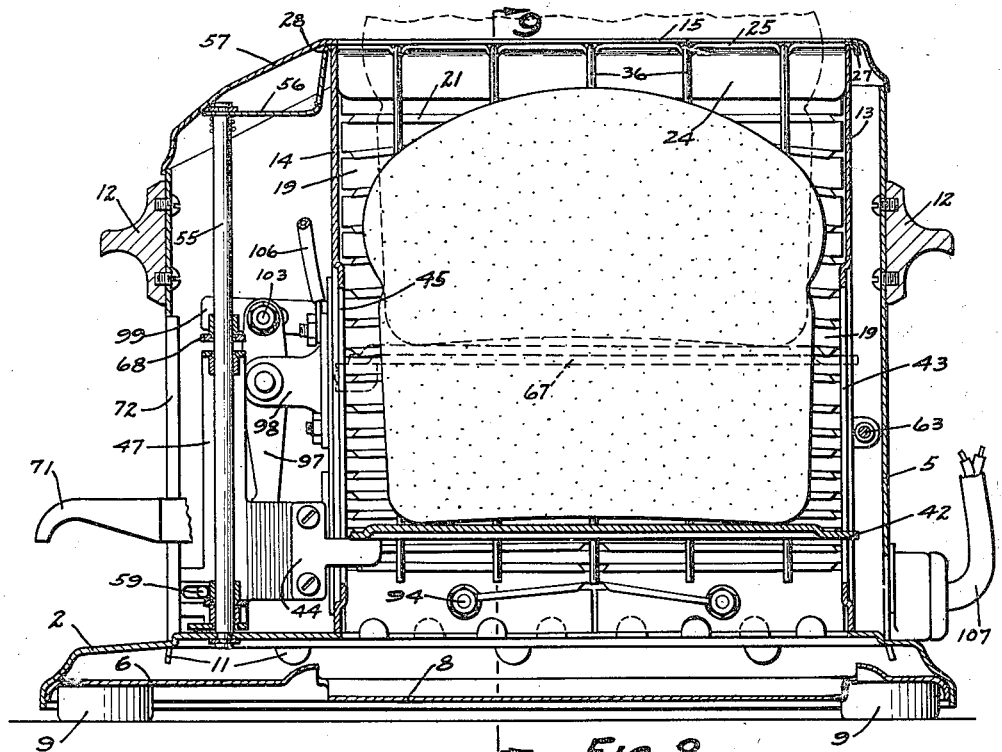
Figure 8 is a vertical sectional view on the line 8—8 of Figure 4, showing the bread carrier in bread-toasting position with a slice of bread thereon.

The toaster featured in this invention comprises a base member 2 here shown having its upper wall portion 3 raised to provide a shoulder 4 against which a casing 5 is seated, as shown. This casing provides a closure for the operating mechanism of the toaster. A bottom plate or cover 6 is suitably secured in the base member 2 and preferably has its central portion 8 depressed, as shown in Figure 8, to provide in effect a tray adapted to receive crumbs from the bread being toasted. The base is provided with suitable feet 9, preferably of rubber.

The walls of the casing 5 are provided at their lower edges with tabs 11 adapted to be received in slots provided in the base member 2, whereby the casing is secured to the base. Suitable handles 12, preferably of a non-conducting material, are provided at each end of the casing, whereby the toaster may be moved from place to place when hot, as when toasting.

Figure 11:
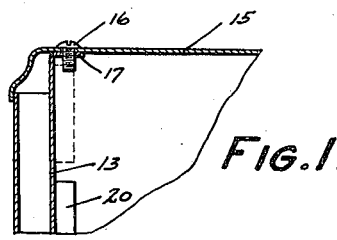
Figure 11 is a detail sectional view on the line 11—11 of Figure 13, showing the connection between the top cover and one of the end frame members.

End frame members 13 and 14 are provided within the casing 5, and have their lower ends suitably secured to the upper raised wall portion 3 of the base member. The upper portions of these frame members are connected together by means of a top cover 15, and suitable screws 16 received in threaded engagement with lugs 17 formed on the upper edges thereof, as shown in Figure 11.

Figure 13:
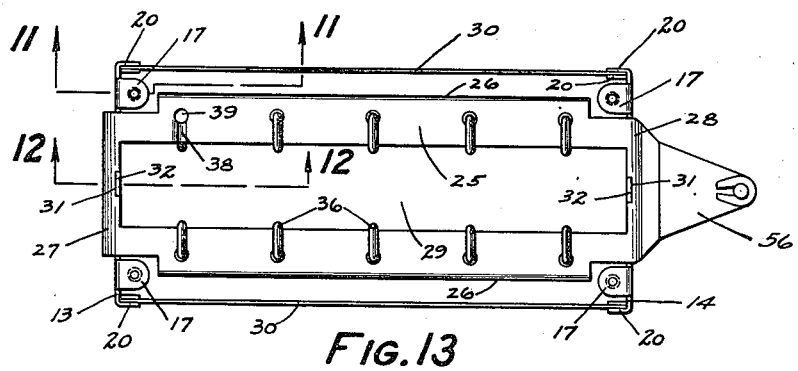
Figure 13 is a detail view showing a plan of the end and top frame members.
Figure 14:
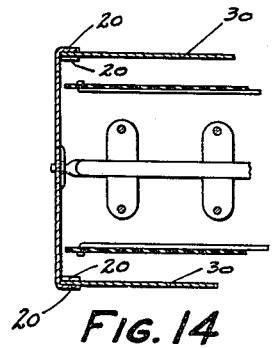
Figure 14 is a detail sectional view on the line 14—14 of Figure 9.

The opposed marginal edges of the frame members 13 and 14 have formed thereon a plurality of inwardly turned flanges 20, arranged in off-set relation, as shown in Figures 13 and 14, to provide means for supporting a pair of auxiliary side wall members 30, which protect the outer casing walls from the heat in the toasting compartment, which will next be described.

Toasting compartment

Figure 1:
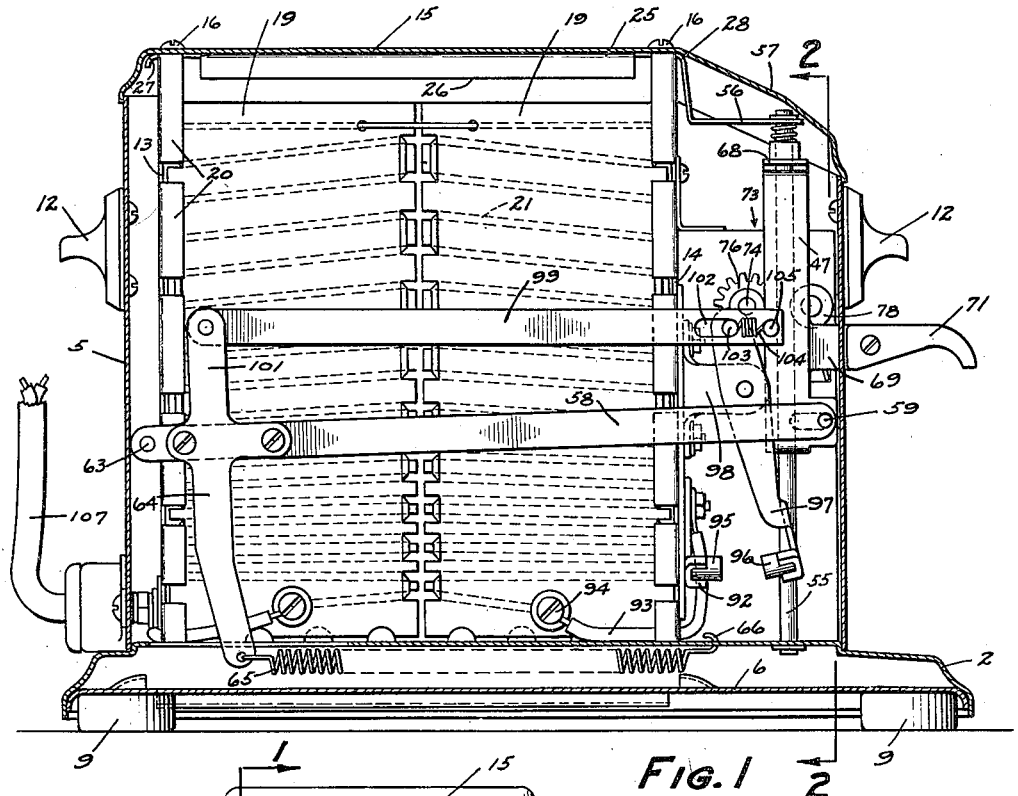
Figure 1 is a vertical sectional view on the line 1—1 of Figure 2, showing the operating means in normal inoperative positions and the switch open.
Figure 2:
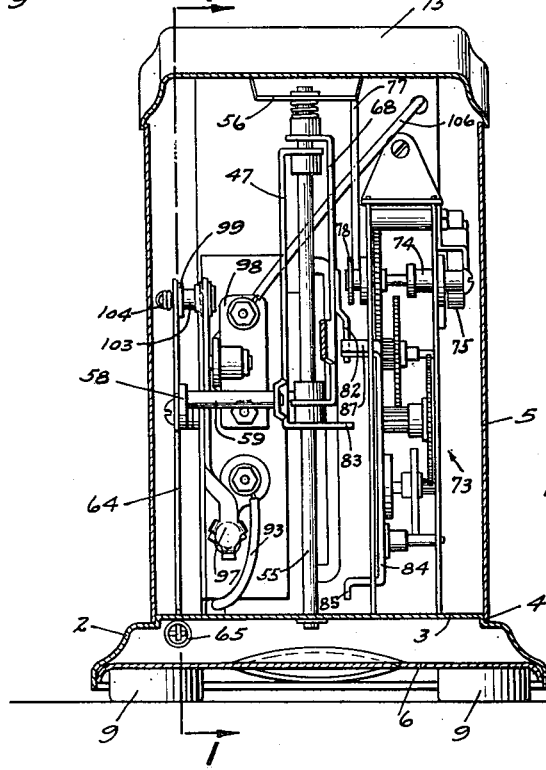
Figure 2 is a vertical sectional view on the line 2—2 of Figure 1.
Figure 9:
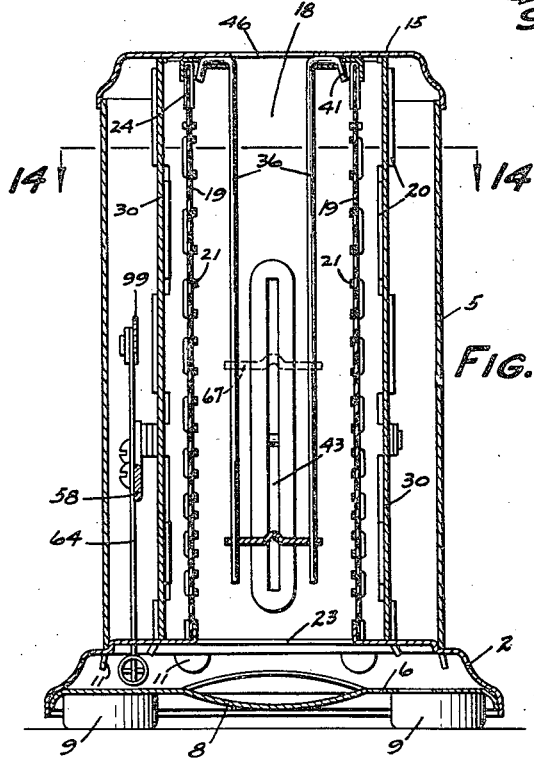
Figure 9 is a cross-sectional view on the line 9—9 of Figure 8.

A toasting compartment 18 is provided within the casing 5, and is defined by the end frame members 13 and 14 and mica plates 19 supported between the end frame members as shown in Figures 1, 3, and 8. These mica plates form the supports for a plurality of heating elements 21. As shown, the upright edges of the mica plates are notches or serrated, as shown in Figures 1 and 2, and the heating elements, which preferably are made from flat wire, are supported upon these mica plates by means of the serrated edges, as shown in Figures 1 and 3. Four mica plates are shown, two on each side, and one heating element 21 is mounted upon each mica plate, as best shown in Figure 3, all of which are connected in series for series operation. The lower edges of the mica plates 19 are supported between upstanding lugs 22 provided in the upper wall portion 3 of the base member 2, as best shown in Figure 9. A central opening 23 is provided in the wall portion 3 of the base member 2, to permit crumbs to drop from the toasting chamber into the tray 8, formed in the bottom plate 6.

Figure 12:
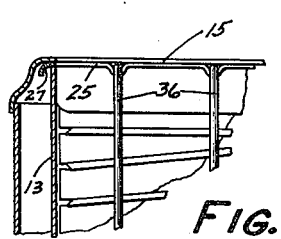
Figure 12 is a detail sectional view on the line 12—12 of Figure 13, showing the connection between the top frame member and one of the end frame members, with the top cover in place.

The upper edges of each pair of mica plates are secured in a U-shaped member 24 which reinforces the upper portions thereof so that the mica plates, including the heating elements, may be removed from the toaster for repairs without disturbing the winding of the heating elements upon the mica plates. The upper portions of the mica plates are supported by means of a member 25 having depending flanges 26 on the opposite side edges thereof adapted to engage the outer portions of the U-shaped members 24 of the mica plates, as best shown in Figure 9. The end portions 27 and 28 of the member 25 are seated upon the upper ends of the end frame members 13 and 14, as shown in Figures 12 and 13, and are secured in position thereon by reason of the top plate 15 being secured to the end frame members, as shown in Figures 11 and 12. The member 25 has an elongated opening 29 through which the bread is inserted into the toasting compartment, and the end walls of the opening 29 are each provided with a recess 31 adapted to receive an upstanding lug 32 provided upon the upper edge of each end frame member, as best shown in Figure 13. These recesses and lugs cooperate to secure the member 25 against longitudinal and lateral movement, when the toaster is assembled as will readily be understood by reference to Figures 12 and 13. It will thus be seen that the mica plates 19 and end frame members 13 and 14 cooperate to provide the upright walls of the toasting compartment 18.

Bread carrier

Figure 7:
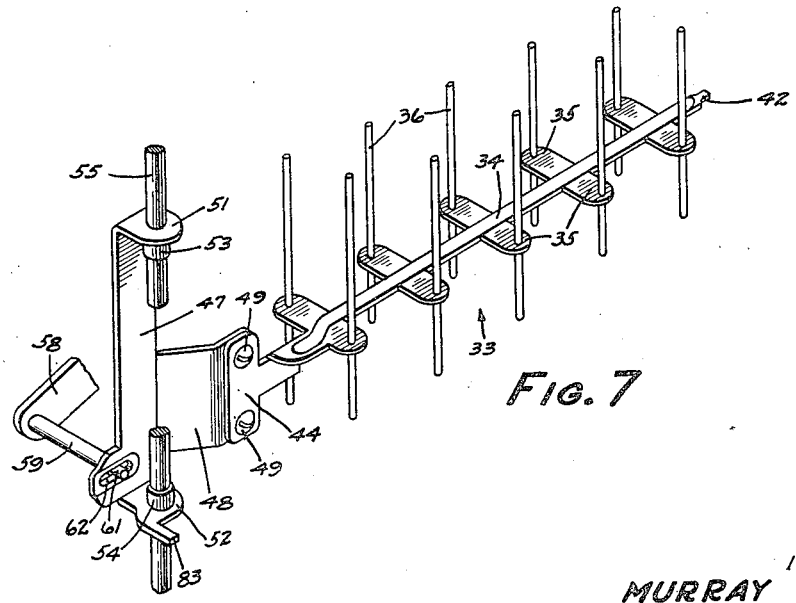
Figure 7 is a detail perspective view showing the bread carrier removed from the toaster.

The means for supporting the bread within the compartment 18 consists of a bread carrier 33, best shown in Figures 7, 8, and 9. This bread carrier comprises an elongated portion 34 provided with oppositely projecting lugs 35 apertured to receive a plurality of guard wires or rods 36, having suitable hooks 37 formed at their upper ends which are seated in recesses 38 provided in the top member 25, as shown in Figure 13. An aperture 39 is provided at the outer end of each recess 38 adapted to receive the depending end portions 41 of the wires 36. (See Figure 9). The end portion 42 of the bread carrier 33 is movable up and down in a slot 43 provided in the end frame member 13, as shown in Figure 8. The opposite end of the carrier is here shown provided with a T-head 44 which projects through a slot 45 provided in the end frame member 14. (See Figure 8). The slots 43 and 45 guide the bread carrier in its up and down movement, it being understood that the wires 36 are permanently secured at their upper ends between the top plate 15 and the member 25, as best shown in Figure 9. The ears or lugs 35 of the bread carrier 34 are adapted to slide up and down on the wires 36, when the toaster is operated. The top plate 15 has an enlongated opening 46, which registers with the opening 29 in the top member 25, whereby the bread may be inserted into the toasting compartment, indicated by the dotted lines in Figure 8.

Bread carrier support

The means for supporting the bread carrier is shown in Figures 2, 4, 7, and 15, and comprises a supporting member 47, here shown having an off-set portion 48 to which the T-head 44 of the bread carrier 34 is secured by such means as screws 49. The end portions 51 and 52 of the supporting member 47 are here shown bent at right angles to the body portion thereof and provided with suitable bushings 53 and 54, respectively, adapted to slidably engage an upright supporting rod 55 having its lower end portion suitably secured to the wall portion 3 of the base member 2. The upper end portion of the rod 55 is secured to an extension 56 provided at the forward end of the top frame member 25, as shown in Figures 1, 3, 8, and 13. This extension is off-set downwardly as shown so as to slot 102 adapted to receive a stud or pin 103 secured to the upper end of the contact arm 97, as shown in Figures 1 and 3. A spring 104 has one end attached to the pin 103 and its opposite end to a pin 105 fixed to the end of the link 99. The spring 104 constantly exerts a pull on the pin 103 and tends to hold it against one end of the slot 102, as is clearly shown in Figure 1. As shown in Figure 4, the contact arm 97 is electrically connected by a wire 106 to a terminal provided upon one of the mica plates located at the opposite side of the toaster. This terminal is, in turn, connected to one of the heating elements.

The operation of the switch is as follows: when the bread carrier is moved from non-toasting to toasting position by depression of the finger grip 71, the arm 58 will be moved downwardly, thereby causing the upper end portion 101 of the bracket 64 to move from the position shown in Figure 1 to that shown in Figure 2, thereby longitudinally moving the link 99 in a direction towards the right when viewed as shown in Figures 1 and 2. Such movement of the link 99 will cause the lower portion of the switch arm 97 to move in a direction towards the stationary contact 95 until the contact 96 electrically engages the stationary contact, whereupon the spring 104 will elongate, as shown in Figure 3. When the bread carrier is released and moves to non-toasting position, the switch will be automatically opened, as shown in Figure 1. Current is supplied to the heating elements through the usual connection 107, shown in Figures 1 and 2.

Operation

In the operation of this novel toaster, a slice of bread is dropped by gravity into the toasting compartment 18 onto the bread carrier 34, as indicated by the dotted lines in Figure 8, it being understood that the bread carrier is normally in non-toasting position. The finger grip is then depressed to the position shown in Figure 3, thereby causing the actuator 68 to move the bread carrier support 47 downwardly until the detent 83 at the lower end of the support engages the lower end portion 85 of the trip lever 84, as shown in Figure 15, whereupon the bread carrier will be locked in toasting position. Such movement of the bread support 47 will cause the arm 58 to be moved downwardly, thereby causing the switch operating mechanism to be actuated to close the switch, as shown in Figure 3. Depression of the finger grip 71 also rewinds or renders the clock mechanism 73 operative, as hereinbefore stated, because of the rack bar 77 being moved downwardly by the actuator 68.

The clock mechanism will then operate the actuator 68 which will slide upwardly on the supporting rod 55 independently of the bread carrier support 47. As the actuator approaches the limit of its upward movement, the cam face 89 on the abutment member 82 will engage the upper end portion 87 of the trip lever and move it outwardly, whereby the lower end portion 85 of the trip lever will become disengaged from the detent 83 and allow the spring 65 to move the bread carrier upwardly to non-toasting position, which, at the same time, will cause the switch to be opened to interrupt the flow of current to the heating elements, as shown in Figure 1. When the actuator 68 reaches the limit of its upward movement, the clock mechanism will be interrupted until the grip 71 is again depressed.

Figure 10:
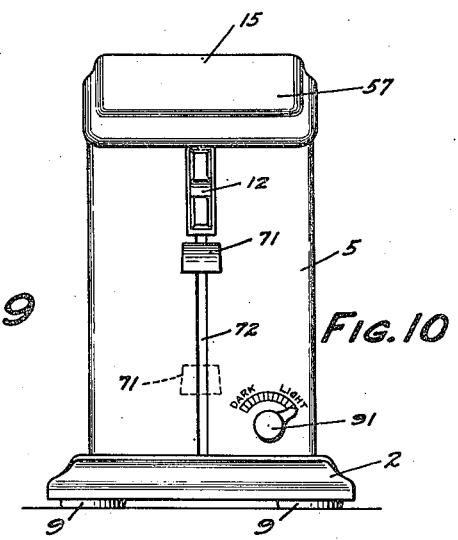
Figure 10 is a front view of the toaster, showing the single operating member and the means for varying the timing of the toasting interval.

Should it be desired to release the bread carrier from toasting position before the clock mechanism releases the carrier, the trip lever 84 may be operated by manually moving the actuator 68 upwardly, whereupon the abutment member 89 will engage the upper end of the trip lever and cause the release of the bread carrier, as hereinbefore described. It will thus be seen that the operation of this novel toaster is controlled entirely by movement of the single finger grip 71, which, as hereinbefore stated, has two functions. First, it provides means for moving the bread carrier into toasting position and, at the same time, closes the switch, and rewinds or conditions the clock mechanism, and, second, it provides means for manually releasing the bread carrier to permit it to return to non-toasting position before the clock mechanism has completed its cycle of operation to automatically release the carrier. This latter feature is important in that it reduces the number of controls and provides a toaster which may be operated from a single control means. The toasting interval may be varied by rotation of the adjusting screw or button 91, as shown in Figure 10.

I claim as my invention:

1. A toaster including a movable bread carrier, means normally urging said carrier into non-toasting position, means for retaining the carrier in bread-toasting position, a timing mechanism automatically operable to actuate said retaining means after a predetermined toasting interval to permit the bread carrier to move to non-toasting position, an operating member adapted upon movement in one direction to move the bread carrier into bread-toasting position and render said mechanism operative, and means made operable by reverse movement of said member independently of said timing mechanism and said bread carrier, to thereby render said retaining means inoperative, whereby the bread carrier is returned to non-toasting position independently of said timing mechanism.

2. A toaster including a heating circuit provided with a control switch, a movable bread carrier, means constantly urging said carrier into non-toasting position, means for retaining said carrier in bread-toasting position, a timing mechanism automatically operable to actuate said retaining means after a predetermined toasting interval to permit the bread carrier to move to non-toasting position, a manually operable member adapted upon movement in one direction to move the bread carrier into bread-toasting position and render said mechanism operative, means made operable by reverse movement of said member independently of said timing mechanism to cause said retaining means to become inoperative and permit the bread carrier to move to non-toasting position independently of said timing mechanism, and means operatively connecting said control switch with the carrier whereby movement of the carrier will automatically control the operation of the switch.

3. A toaster including a toasting compartment having a bread carrier movably mounted therein, a detent for retaining said carrier in bread-toasting position within said chamber, a timing mechanism adapted to automatically move said detent into inoperative position after a predepermit the front end portion 57 of the top cover 15 to be inclined downwardly, as shown in Figures 1, 3, and 4, for the sake of appearances. The bread carrier supporting member 47 is slidable up and down upon the supporting rod 55 as will be clearly understood by reference to Figures 2, 4 and 15.

*Manual control*

The means for manually operating the bread carrier is shown in Figures 1 to 6, inclusive, and consists of an arm 58 having a stud 59 secured to one end thereof and laterally extending therefrom, as shown in Figure 15. The opposite end of the stud has a reduced extension 61 slidably received in a slot 62 provided in the bread carrier support 47 as best shown in Figures 7 and 15. The opposite end of the arm 58 is supported upon a pivot 63 secured to the rear frame member 13. A bracket 64 is secured to the arm 58 adjacent the pivot 63, and has one end of a spring 65 connected with the lower end thereof, the opposite end of which is attached to the wall portion 3 of the base 2, as indicated at 66 in Figures 1 and 3. This spring constantly tends to urge the free end of the arm upwardly to the position shown in Figure 1, wherein the bread carrier will be positioned, as indicated by the dotted lines 67 in Figures 8 and 9.

Figures 5, 6:
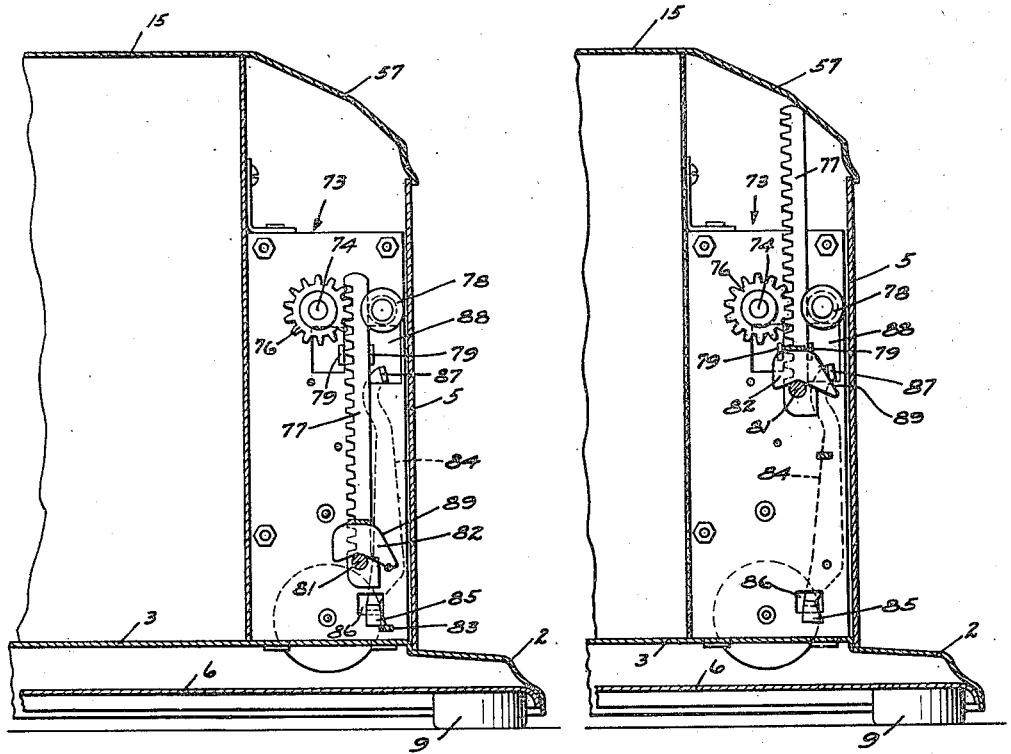
Figure 5 is a detail sectional view illustrating the connection between the bread-carrier and the timing mechanism with the parts shown in non-toasting positions.
Figure 6 is a view similar to Figure 5, showing the parts in bread toasting positions.

An actuator 68 is slidably mounted upon the supporting rod 55, as shown in Figure 15 and is provided with an extension 69 having a suitable finger grip 71 secured thereto positioned exteriorly of the casing 5, as shown in Figures 1, 3, and 6. The extension 69 is vertically movable in a slot 72 provided in a front wall of the casing. The operating member 68 is slidable upon the rod 55 independently of the bread carrier support 47, as will readily be understood by reference to Figure 15. When the bread carrier support 47 is in the position shown in Figures 1 and 2, it will be noted that the lower portion of the actuator 68 will be engaged with the upper end of the bushing 54, provided in the lower end of the carrier support 47. Thus, when the finger grip 71 is depressed or moved from the position shown in full lines in Figures 1 and 10, to the position shown in Figures 3 and 8, the bread carrier will be moved to its operative or bread-toasting position, shown in full lines in Figure 8, and the arm 58 will assume the position shown in Figure 3.

*Automatic control*

The means for automatically releasing the bread carrier after a predetermined toasting interval is shown in Figures 2, 4, 5, 6, and 15, and comprises a suitable motor or timing mechanism 73, including a main operating shaft 74 adapted to be rotated in one direction by suitable means such as a clock spring 75, indicated in Figure 4. A suitable ratchet device, not shown, prevents accidental unwinding of the clock spring.

This motor or clock mechanism forms the subject matter of a co-pending application, and it is therefore thought unnecessary to describe the same in detail in the present application.

A pinion 76 is secured to the main operating shaft 74 and meshes with a rack bar 77, having its upper portion supported between the pinion 76 and a grooved roller 78, rotatably mounted upon the frame of the motor. Guides 79 are provided directly beneath the pinion 74 and roller 78 to guide the rack bar in its vertical movement during operation of the toaster. An outwardly extending stud 81 is shown secured to the lower end of the rack bar and projects into the path of an abutment member 82 suitably secured to the actuator 68, preferably in spaced relation thereto as indicated in Figures 2 and 4. When the actuator 68 is moved downwardly by pressure upon the finger grip 71, the abutment member 82 will engage the stud 81 and move the rack bar downwardly from the position shown in Figure 5 to that shown in Figure 6, which, in turn, rotates the pinion 76 and the shaft 74 and causes the spring 75 to be wound up.

The means provided for retaining the bread carrier in bread toasting position is best shown in Figure 15, and comprises a detent 83 provided on the lower portion of the bread carrier support 47 and projects therefrom in a direction towards the clock mechanism 73, as shown in Figures 3, 4, and 15. A trip lever 84 is pivotally mounted within the frame of the clock mechanism 73 and has its lower end portion 85 off-set and projecting through an opening 86 in the clock frame with its lower end normally positioned in the path of the detent 83 on the bread carrier support 47, as shown in Figure 15, so as to engage the detent and lock the bread carrier support in bread-toasting position when the actuator 68 is depressed. The upper end portion 87 of the trip lever 84 projects through an opening 88 in the clock frame into the path of the abutment member 82 on the actuator. The member 82 has an inclined face 89 adapted to engage the end portion 87 of the trip lever and move the upper end thereof in a direction towards the right, when viewed as shown in Figure 5, thereby causing the lower terminal 85 of the trip lever to become disengaged from the detent 83, whereupon the bread carrier will be automatically moved from bread-toasting position, shown in full lines in Figures 8 and 9, to non-toasting position indicated by the dotted line 67, by the action of the spring 65. The abutment member 82 is moved upwardly by the stud 81 on the rack bar 77, because of the latter being actuated by the clock spring 75, whereby, after a predetermined time interval, the trip lever will be actuated to cause the automatic release of the bread carrier support and allow the bread carrier to assume a non-toasting position. The timing of the toasting interval is regulated by suitable means indicated at 91 in Figure 10.

*Switch operating mechanism*

The toaster herein disclosed is provided with means for automatically opening the heating circuit each time the bread carrier is moved to non-toasting position. A contact member 92 is secured to the front frame member 14 and has a wire 93 connecting it with a terminal 94 provided upon one of the mica plates 19. The contact member 92 preferably has a carbon contact 95 detachably supported therein adapted to engage a movable contact 96 secured in an arm 97 pivotally supported upon the end frame member 14 by means of a bracket 98 suitably secured to the frame member 14.

The means for operating the movable contact arm 97 is here shown as consisting of a link 99 having one end pivotally connected to the upper end portion 101 of the bracket 64. The opposite end portion of the link 99 has a termined toasting interval to permit the bread carrier to be moved to non-toasting position, an operating member adapted upon movement in one direction, to move the bread carrier into bread-toasting position, and means connected to said detent and adapted to be actuated by manual movement of said member in the opposite direction, independently of said carrier to thereby render said detent inoperative and permit the bread carrier to return to non-toasting position independently of the timing mechanism.

4. An electric toaster including a toasting compartment having a bread carrier movably mounted therein, a heating circuit for said compartment provided with a control switch means for retaining said carrier in bread toasting position within said compartment, a timing mechanism automatically operable to actuate said retaining means after a predetermined toasting interval to permit the bread carrier to move to non-toasting position, a manually operable member adapted upon movement in one direction to move the bread carrier into bread-toasting position and render said timing mechanism operable, means made operable by reverse movement of said member, independently of said timing mechanism to render said retaining means inoperative and permit the bread-carrier to be returned to non-toasting position independently of the timing mechanism, and means operatively connecting said control switch with the carrier whereby movement of the carrier will automatically control the operation of said switch.

5. An electric toaster including a toasting compartment having a bread carrier movably mounted therein, a heating circuit for said compartment provided with a control switch means for retaining said carrier in bread toasting position within said compartment, a timing mechanism automatically operable to actuate said retaining means after a predetermined toasting interval to permit the bread carrier to move to non-toasting position, a manually operable member adapted upon movement in one direction, to move the bread carrier into bread-toasting position and render said timing mechanism operable, means made operable by movement of said member in the opposite direction, to render said retaining means inoperative and permit the bread-carrier to be returned to non-toasting position independently of the timing mechanism, and means operatively connecting said control switch with the carrier whereby movement of the carrier will automatically control the operation of said switch.

6. An electric toaster including a toasting compartment having a bread carrier movably mounted therein, a support for said carrier, means normally holding the bread carrier in non-toasting position, a trip for locking the carrier in toasting position, a mechanism automatically operable to actuate said trip after a predetermined toasting interval to permit the bread carrier to move to non-toasting position, an operating member mounted on said support and adapted for independent movement thereon, a switch for controlling the supply of current to the toaster, and said operating member being adapted, upon movement in one direction, to move the bread carrier into toasting position, close said switch and render said timing mechanism operative, and said member when moved in the opposite direction independently of the bread carrier, causing said trip to be actuated whereby the bread carrier may return to non-toasting position independently of said timing mechanism.

7. An electric toaster including a toasting compartment provided with a heating circuit, a bread carrier mounted for vertical movement within said compartment, a rod exteriorly of said compartment providing a support for said carrier, a trip for retaining said bread carrier in bread-toasting position, a timing mechanism automatically operable to actuate said trip after a predetermined toasting interval to permit the bread carrier to be moved to non-toasting position, a switch for controlling the supply of current to said heating element, said switch having an operative connection with the bread carrier whereby, when said carrier is moved into toasting position, said switch will be automatically closed, and when moved into non-toasting position, said switch will be automatically opened, and a manually operable member slidable on said bread carrier support and adapted, upon movement in one direction, to move the bread carrier into toasting position in engagement with said trip, and when moved in the opposite direction independently of the carrier and said timing mechanism, said member will actuate said trip to cause the release of the bread carrier, whereby said carrier may be returned to non-toasting position independently of said timing mechanism.

8. In a toaster, a movable bread carrier, means normally holding the carrier in non-toasting position, a trip for retaining the carrier in toasting position, a heating means, and a single operating lever adapted upon movement in one direction, to move the carrier into toasting position in engagement with said trip, and when moved in the opposite direction independently of said carrier, said lever will cause said trip to be actuated to release the carrier.

9. In a toaster, a movable bread carrier, means normally holding the carrier in non-toasting position, a detent operatively associated with said carrier and adapted to retain it in toasting position, a single operating lever for manually moving the carrier into toasting position in engagement with said detent, said lever being adapted for reverse movement independently of the carrier, and means connected with the detent and adapted to be actuated by reverse movement of said lever, whereby the bread carrier is released.

10. In a toaster comprising a casing having a toasting compartment therein, a bread carrier movably mounted in said compartment, means constantly urging the carrier into non-toasting position, a detent for locking the carrier in toasting position, a heating circuit provided with a switch, and a single operating lever for controlling the operation of the toaster, said lever being operatively connected with the bread carrier, whereby when it is moved in one direction, the carrier will be moved into toasting position in engagement with said detent, and at the same time said switch will be closed, and when said lever is moved in the opposite direction independently of the carrier, it will actuate said detent and release the carrier, the return movement of said carrier to non-toasting position causing said switch to be automatically opened.

11. In an automatic toaster, a movable bread carrier, means normally retaining the carrier in non-toasting position, a device for holding the carrier in toasting position, heating means comprising an electric circuit, a switch in said circuit operatively associated with the bread carrier, and an operating lever adapted upon movement in one direction, to move the carrier into toasting position in operative engagement with said device, and when moved in the opposite direction, independently of the carrier and switch, said lever will actuate said carrier holding device, whereby the carrier is prematurely released.

12. In an automatic toaster, a movable bread carrier, resilient means normally retaining the carrier in non-toasting position, a device for holding the carrier in toasting position, heating means associated with the carrier, and an operating lever adapted upon movement in one direction, to move the carrier into toasting position in operative engagement with said device, and when moved in another direction, independently of the carrier, said lever will actuate said carrier holding device and cause it to release the carrier, whereby the latter is prematurely released and the heating means rendered inoperative.

13. In an automatic toaster, a movable bread carrier, means normally retaining the carrier in non-toasting position, a trip for holding the carrier in toasting position, heating elements, a control switch for said heating elements operatively associated with the bread carrier, a support, and an operating lever freely mounted on said support and adapted upon movement in one direction, to move the carrier into toasting position and effect the closing of said switch, and when moved in another direction, independently of the carrier and switch, said lever will actuate said trip, whereby the carrier is prematurely released and said control switch opened.

14. In a toaster, a movable bread carrier, means constantly urging the carrier into non-toasting position, a detent for locking the carrier in toasting position, heating elements, an electric circuit for said heating elements including a normally open control switch, and a single operating lever for controlling operation of the toaster, movement of said lever in one direction, closing said switch and causing the carrier to be moved into bread toasting position in engagement with said detent, and movement of the lever in the opposite direction, independently of the carrier opening the switch and causing the carrier to be released from said detent, whereby it is returned to non-toasting position.

15. In a toaster, a movable bread carrier, means constantly urging the carrier into non-toasting position, a detent for locking the carrier in toasting position, heating elements, and a single operating lever for controlling operation of the toaster, movement of said lever in one direction, rendering said heating elements operative and causing the carrier to be moved into bread toasting position in engagement with said detent, and movement of the lever in the opposite direction, independently of the carrier rendering the heating elements inoperative and causing the carrier to be released from said detent, whereby it is returned to non-toasting position.

16. In a toaster, a movable bread carrier, means constantly urging the carrier into non-toasting position, a detent for locking the carrier in toasting position, heating elements, and a single operating lever for controlling operation of the toaster, movement of said lever in one direction, increasing the temperature of said heating elements and causing the carrier to be moved into bread toasting position in engagement with said detent, and movement of the lever in the opposite direction, independently of the carrier decreasing the temperature of the heating elements and causing the carrier to be released from said detent, whereby it is returned to non-toasting position.

17. In a toaster, a casing having an oven therein, a bread carrier movably supported in said oven, means for normally holding the carrier in non-toasting position, means for retaining the carrier in toasting position in the oven, heating means, a control device for said heating means, and a single operating lever for controlling the operation of the toaster, said operating lever having operative connections with the carrier and said control device, and adapted upon movement in one direction, to move the carrier into toasting position in locking engagement with said retaining means, and operate said control device and cause the heating means to function, and when said operating lever is moved in the opposite direction, independently of the carrier, said lever will cause the release of the bread carrier and render said heating means inoperative.

MURRAY IRELAND.